US012364958B2

(12) United States Patent
Heise

(10) Patent No.: US 12,364,958 B2
(45) Date of Patent: Jul. 22, 2025

(54) STATIC MIXER

(71) Applicant: Fujifilm Diosynth Biotechnologies UK Limited, Billingham (GB)

(72) Inventor: Charles Heise, Billingham (GB)

(73) Assignee: Fujifilm Diosynth Biotechnologies UK Limited, Billingham (GB)

( * ) Notice: Subject to any disclaimer, the term of this patent is extended or adjusted under 35 U.S.C. 154(b) by 858 days.

(21) Appl. No.: 17/293,541

(22) PCT Filed: Nov. 13, 2019

(86) PCT No.: PCT/GB2019/053213
§ 371 (c)(1),
(2) Date: May 13, 2021

(87) PCT Pub. No.: WO2020/099865
PCT Pub. Date: May 22, 2020

(65) Prior Publication Data

US 2022/0001342 A1 Jan. 6, 2022

(30) Foreign Application Priority Data

Nov. 16, 2018 (GB) ..................................... 1818709

(51) Int. Cl.
*B01F 25/452* (2022.01)
*B01F 25/00* (2022.01)
*B01F 25/435* (2022.01)

(52) U.S. Cl.
CPC ...... *B01F 25/45211* (2022.01); *B01F 25/435* (2022.01); *B01F 2025/912* (2022.01)

(58) Field of Classification Search
CPC ........ F15C 1/18; B01F 5/0651; B01F 5/0614; B01F 5/064; B01F 5/0659; B01F 25/4314;
(Continued)

(56) References Cited

U.S. PATENT DOCUMENTS 1,698,432 A * 1/1929 Erickson ........... B01F 25/45211 196/46
1,733,545 A * 10/1929 Leaver ............. B01F 25/45211 196/46
(Continued)

FOREIGN PATENT DOCUMENTS

CN 107441974 A 12/2017
JP 2016073899 A 5/2016
(Continued)

OTHER PUBLICATIONS

Jun. 6, 2019 (GB)—Search Report Application 1818709.6.
(Continued)

*Primary Examiner* — Charles Cooley
(74) *Attorney, Agent, or Firm* — Banner & Witcoff, Ltd.

(57) ABSTRACT

A static mixing apparatus for mixing a fluid, preferably a liquid is provided. The mixer comprises a plurality of chambers in series, the first chamber of the series comprising a fluid inlet, and the final chamber of the series comprising a fluid outlet, each chamber except the final chamber including orifices defining a flow path from the fluid inlet and into each chamber in series and to the fluid outlet and the final chamber including a gas outlet located at the opposite end of the static mixing apparatus to the fluid inlet and fluid outlet.

15 Claims, 4 Drawing Sheets

(58) Field of Classification Search

CPC .. B01F 25/432; B01F 25/4334; B01F 25/435; B01F 25/45211; B01F 2025/912; F16L 55/02772; F16L 57/06; F15D 1/0015; F15D 1/04; F17D 1/20; B65G 53/521

See application file for complete search history.

(56) References Cited

U.S. PATENT DOCUMENTS

| | | | | | |
|---|---|---|---|---|---|
| 2,085,132 | A | * | 6/1937 | Underwood | C10C 1/00 366/340 |
| 2,740,616 | A | * | 4/1956 | Walden | B01F 25/435 48/189.4 |
| 2,747,844 | A | * | 5/1956 | Slayter | B01F 25/311 366/178.2 |
| 3,167,305 | A | * | 1/1965 | Backx | A23D 7/02 366/338 |
| 3,190,618 | A | * | 2/1965 | Katzen | B01F 25/45211 366/337 |
| 4,043,539 | A | * | 8/1977 | Gilmer | B01F 25/435 138/42 |
| 4,189,243 | A | * | 2/1980 | Black | B01F 25/45 366/341 |
| 4,222,671 | A | | 9/1980 | Gilmore | |
| 4,367,808 | A | * | 1/1983 | Oberg | F01N 1/003 181/275 |
| 4,474,071 | A | | 10/1984 | Marteau d'Autry | |
| 4,994,242 | A | * | 2/1991 | Rae | B01F 25/45 55/446 |
| 5,409,672 | A | | 4/1995 | Cetinkaya | |
| 6,213,453 | B1 | | 4/2001 | Ou | |
| 6,629,775 | B2 | | 10/2003 | Choikhet et al. | |
| 2006/0285433 | A1 | | 12/2006 | Yang et al. | |
| 2011/0110845 | A1 | * | 5/2011 | Schneider | B01J 19/26 423/500 |
| 2013/0037277 | A1 | * | 2/2013 | Henry | B01F 25/45211 169/14 |
| 2013/0242692 | A1 | * | 9/2013 | Soukup | B01F 25/4233 366/340 |
| 2014/0087042 | A1 | | 3/2014 | Gordon et al. | |
| 2022/0001342 | A1 | * | 1/2022 | Heise | B01F 25/45211 |

FOREIGN PATENT DOCUMENTS

| | | | | | |
|---|---|---|---|---|---|
| NL | 132191 | C | | 9/1971 | |
| WO | 2010047167 | A1 | | 4/2010 | |
| WO | 2010047168 | A1 | | 4/2010 | |
| WO | WO-2013047393 | A1 | * | 4/2013 | B01F 5/0615 |
| WO | 2015171997 | A1 | | 11/2015 | |
| WO | 2017118835 | A1 | | 7/2017 | |
| WO | 2019158906 | A1 | | 8/2019 | |

OTHER PUBLICATIONS

Feb. 17, 2020 (WO) International Search Report and Written Opinion of the International Searching Authority issued in respect of International Application No. PCT/GB2019/053213.

May 18, 2021 (WO) International Preliminary Report on Patentability issued in respect of International Application No. PCT/GB2019/053213.

Dec. 1, 2022 (EP) Communication pursuant to Art. 94(3) EPC—EP Application No. 19809548.1.

Jul. 31, 2023 (JP) Search Report in respect of JP application 2021-526507.

Jul. 18, 2023 (JP) Notice of Reasons for Refusal—JP application 2021-526507.

* cited by examiner

STATIC MIXER

RELATED APPLICATIONS

This application is a National Stage Application under 35 U.S.C. 371 of PCT application PCT/GB2019/053213 designating the United States and filed Nov. 13, 2019; which claims the benefit of GB application number 1818709.6 and filed Nov. 16, 2018 each of which are hereby incorporated by reference in their entireties.

The present invention concerns a static mixer, more particularly a mixer for liquids, especially aqueous liquids.

Many designs of static mixers, especially in-line static mixers, have been proposed for mixing two or more liquids, which are combined at the same time in the flow path and then mixed as disclosed in U.S. Pat. No. 4,222,671. Further examples include apparatus such as that disclosed in U.S. Pat. No. 6,629,775, where the flow entering the mixer is split into partial flows having differing lengths of flow path, and recombining the partial flows. Other examples include apparatus disclosed in US20060285433, where the convoluted flow path induces mixing. Existing mixer designs are operated with the mixing liquids occupying all of the flow path volume within the device and therefore the residence time of the whole liquid body within the mixer is dependent on the flow rate, cross-sectional area and mixer length. These devices are frequently ineffective at mixing liquids that are delivered to the static mixer in a chronological order, rather than contemporaneously. Furthermore, these devices do not have the capacity to maintain a liquid-gas boundary within the device, when present, and will tend to promote aeration of the liquid when gas bubbles are introduced into one or more of the inlet liquid streams.

According to a first aspect of the present invention, there is provided a static mixing apparatus (a "mixer") for mixing a fluid, preferably a liquid, comprising a plurality of chambers in series, the first chamber of the series comprising a fluid inlet, and the final chamber of the series comprising a fluid outlet, each chamber other than the final chamber in the series being in fluid connection with a subsequent chamber, the fluid connection comprising a plurality of orifices dispersed along a direction of flow, the nearest point to the fluid inlet of each subsequent orifice to the inlet overlapping with the furthest point from the fluid inlet of the previous orifice, and being off-set along the direction of flow from the previous orifice.

Preferably each chamber is concentric, and most preferably of circular cross section. The chambers are preferably elongated along the longitudinal axis, having parallel chamber walls, and are of uniform cross-sectional area. Most preferably, the first chamber is the innermost chamber and the final chamber the outermost.

Preferably the mixer comprises an even number of chambers, most preferably concentric chambers. In many embodiments, four chambers are preferred.

Preferably the mixer comprises concentric tubes, the inlet and outlet being located at the same end of the tubes. In some highly preferred embodiments, a gas outlet is located at the opposite end of the mixer to the inlet and outlet. Most preferably, the inlet and outlet are located at the base of the mixer, and the gas outlet is located at the top of the mixer.

In some embodiments, along the longitudinal direction for a given chamber, the nearest point to the inlet of each subsequent orifice and the furthest point from the inlet of the preceding orifice are aligned such that they form part of the same cross-section perpendicular to the axis of the chamber. Preferably, along the longitudinal direction for a given chamber, the nearest point to the inlet of each subsequent orifice and the furthest point from the inlet of the preceding orifice overlap by up to about 50% of the length of the subsequent orifice, preferably greater than about 1%, such as from 5 to 25%, of the length of the subsequent orifice. Overlap of the start and end of each subsequent orifice enables the mixer also to function as a bubble trap, by ensuring the liquid/gas boundary is at the same level within and across each chamber of the mixer. In many embodiments, the sum of the area of the orifices of the first divider is between 5 and 20, preferably between 10 and 15 times the cross-sectional area of the inner chamber and preferably the sum of the area of the orifices in the divider between two chambers is equal for all dividers. In some preferred embodiments, the outer walls of the even-numbered chambers also include additional chamber exits (not included in the calculation of the area of the orifices) located at the same end of the mixer as the inlet. The width of each additional chamber exit is often up to 25%, preferably from 15 to 20%, of the total length of the perimeter of the chamber wall, and commonly the total width of all additional chamber exits is up to 50%, preferably from 30 to 40%, of the length of the perimeter of the chamber wall. Most preferably, two additional chamber exits are present, located on opposite sides of the chamber. In many embodiments, the height of the additional chamber exits is often selected to be from 100% to 140%, such as from 110% to 130% of the distance from the base of the chamber to the first orifice. In order to prevent back-pressure being generated by the mixer, the total area of the orifices plus any additional chamber exits for each chamber is selected to be no less than the area of the inlet.

The chambers are sealed, apart from the inlet, outlet, fluid connections to other chambers and the optional gas outlet if present.

When the inlet is located at the base of the mixer, it is preferred that the area of each of the orifices in the wall of all odd-numbered chambers that are fluidly connected to a subsequent chamber, increases along the direction of the chamber away from the inlet end of the mixer. Preferably, the distance of the first orifice from the fluid inlet end of the chamber is equal to the length of the first orifice for these chambers.

In some embodiments the distance of the fluid inlet and outlet to the end of their respective chambers is within 1/10 of the overall length of the chambers. In preferred embodiments the fluid inlet and outlet are at the ends of their respective chambers.

In many highly preferred embodiments, especially where the inlet and outlet are located at the base of the mixer, the chamber wall between the even-numbered chambers and the subsequent odd-numbered chamber have two additional chamber exits of equal area at the base of the fluid inlet end of the chamber, whose combined area is advantageously between 10 and 50% of the area of the fluid inlet, preferably 20 to 35% and most preferably 25 to 30%. The centre points of the additional chamber exits are advantageously at 180 degrees to (ie opposite) each other and 90 degrees to the centre of the subsequent orifice above these additional chamber exits. The length of these additional chamber exits are preferably equal to the length of the distance of the first orifice from the end of the fluid inlet end of the chamber in the wall of the preceding odd-numbered chamber. All subsequent orifices in the even numbered chamber walls preferably have the same increasing length and distance from the fluid inlet end of the chamber as the orifices in the odd numbered chamber walls. In especially preferred embodiments, the combined area of all orifices, including any additional chamber exits, within the chamber wall separating two chambers is greater than the area of the fluid inlet.

In some embodiments, all of the orifices are the same width, and in further such embodiments, for orifices in the odd-numbered chambers, the length of each orifice increases with the flow direction along the chamber wall, preferably increasing by a fixed amount for each subsequent orifice, and for orifices in the even-numbered chambers, the length of each orifice decreases with the flow direction along the chamber wall, preferably decreasing by a fixed amount for each subsequent orifice. In other embodiments, all of the orifices are all equal in width and length.

Preferably, the off-set of the orifices forms a spiral pattern along the direction of flow. Most preferably, the off-set of the orifices for all chambers forms an identical spiral pattern, including multiple, especially double, spiral patterns, along the direction of flow. The off-set angle for the subsequent orifice from the centre line through the mixer and through a preceding orifice is preferably selected to be 90 degrees for a single or double spiral and 120 degrees for a triple spiral. In these preferred embodiments, the orifices make a discontinuous spiral pattern.

The orifices may be of many different shapes, and are commonly one or more of circular, stadium shaped or rectangular. Most preferably, the orifices are all stadium shaped.

Most preferably, for mixers comprising an even number of chambers, such as four chambers, the first orifice along the longitudinal direction in the walls of all odd numbered chamber walls that are in fluid connection with a subsequent chamber are aligned such that they are not directed towards the fluid outlet. In many instances, for embodiments with single spirals, the said first orifice is aligned to be 180 degrees from the direction of the centre of the fluid outlet, for double spirals both offsets are 90 degrees, and for triple spirals, one off-set is 180 degrees and two are 60 degrees relative to the fluid outlet. In some embodiments, where the same pattern of orifices is employed in the walls of each chamber in fluid connection with a subsequent chamber, the orifices in the even numbered chambers are aligned such that the orifices of equivalent distance from the fluid inlet end are at 180 degrees to their matching orifice on the preceding odd numbered chamber walls. This results in an alternating pattern of orifice and wall running out of phase between the odd and even chamber walls as the main body of fluid follows the main serpentine path through the mixer.

In certain embodiments when the fluid is a liquid, the fluid level in the mixing device will be determined by the inlet fluid pressure derived from the device or method to impart flow into the mixing device working against a compressible gas comprised within the sealed mixing device. In other embodiments when the fluid is a liquid, the liquid level in the mixing device will be determined through sensing the liquid level change, and regulating the pressure of a gas in the mixer, preferably the head space of the mixer, through venting or pressurising the mixing device, for example, by the opening or closing of a gas outlet.

In preferred embodiments, the mixer is operated with a proportion of liquid in the mixer less than 100% of the volume of the mixer, such as up to 95%, especially up to 80%, and in many embodiments from 10 to 75% of the volume of the mixer, the proportion commonly being determined by the liquid flow rate, and with the balance of the volume of the mixer comprising a compressible gas, commonly air. Under such conditions, the residence time of the liquid in the mixer is independent of flow rate, as the increased flow rate increases the volume of liquid, and compresses the gas.

It will be recognised that the volumes and areas of the fluid inlets, chambers and outlets, especially the fluid inlet, will be determined by the maximum desired flow rate, for example in the studies resulting in the present invention, a 15 mm diameter fluid inlet and a 1 L total volume mixer has been found to be suitable for flow rates up to 1000 L/h. In some embodiments, the total mixer chamber volume in L is selected to be not more than 0.0015 times the maximum desired feed flow rate in L/h and preferably up to 0.001 times the maximum desired feed flow rate in L/h.

In some embodiments, the ratio of the width of the outermost chamber to the height of the chamber of the mixing device is usually between 1:3 and 1:9, preferably between 1:5 and 1:8. In many preferred embodiments the ratio of width of the outermost chamber to the height of the chamber is between 1:3 and 1:6, more specifically about 1:5.

In many embodiments the cross-sectional area for each subsequent chamber is greater than that of the previous chamber. In some preferred embodiments with four chambers, often the cross-sectional area of the second chamber is between 2 and 4, preferably about 2.5 to 3.25, times greater than that of the first chamber; the cross-sectional area of the third chamber is often between 1.2 and 2 times greater than that of the second chamber; and the cross-sectional area of the fourth chamber is often at least 4 times, such as between 5 and 15 times, preferably between 5 and 10 times, greater than that of the third chamber.

In certain specific embodiments, the cross-sectional area of the first chamber is from 1.5 to 2.5 $cm^2$, the cross-sectional area of the second chamber is from 4.5 to 6.2 $cm^2$, the cross-sectional area of the third chamber is from 7.4 to 9 $cm^2$, and the cross-sectional area of the fourth chamber is from 37 to 50 $cm^2$, and in certain highly specific embodiments, the total volume of the mixer is selected to be from 2.5 to 3 L. Materials of construction for the mixers of the present invention are selected to be compatible with the fluid being mixed, and may comprise for example, metals, such as stainless steel, polymers such as polypropylene, polysulphone and polycarbonate. In certain preferred embodiments, the mixer forms part of a disposable flow path.

Fluids which can be mixed in the mixer of the present invention are preferably liquids, preferably two or more liquids having different chemical and/or physical properties. Most preferably, the liquids are aqueous solutions, or aqueous mixtures comprising water-miscible organic solvents, such as alcohols and glycols. In many embodiments, the liquids comprise aqueous buffer and/or salt solutions, and are preferably bioprocessing solutions, optionally containing one or more biomolecules.

In many highly preferred embodiments, the liquids mixed comprise aliquots of liquids having different chemical or physical properties which arrive at the inlet in a sequential manner. The order of the aliquots arriving at the inlet is commonly determined by the operation of one or more flow controllers allowing egress of feeds of the liquids into the flow-path leading to the inlet. Preferably aliquots of 2, 3, 4, 5, 6, 7 or 8 or more, most preferably, 2, 3 or 4, liquids are provided in a predetermined sequence to the inlet. In many embodiments, the mixer of the present invention serves to smooth variations in the properties and/or composition of a liquid prior to passing through the mixer and produce a substantially uniform liquid after passing through the mixer. It will be recognised that in addition to producing a mixture having substantially constant composition, varying the proportions of the aliquots entering the mixer with time can enable the production of substantially uniform, smooth composition gradients, or smooth liquid composition curves after passing through the mixer.

The mixer according to the present invention is advantageously employed in apparatus for carrying out a bioprocessing operation, and such apparatus forms another aspect of the present invention. Bioprocessing operations that can be carried out by the device for achieving a bioprocessing operation include chromatography, viral inactivation, filtration, refolding, ultrafiltration, diafiltration, microfiltration, in-line conditioning and refolding. In many embodiments, the in-line mixer is located downstream of a pump and upstream of the device for achieving the bioprocessing operation.

Chromatography operations that can be carried out using the apparatus of the present invention include affinity chromatography, ion-exchange (either or both anion and cation exchange) chromatography, hydrophobic interaction chromatography (HIC), reverse-phase chromatography, expanded bed chromatography, mixed-mode chromatography, membrane chromatography and size exclusion chromatography (SEC).

In many embodiments, Protein A affinity chromatography comprises at least one of the unit operations. Devices for carrying out the chromatography operations comprise the appropriate chromatography apparatus, such as a membrane, fibre monolith or column. The number and sequence of chromatographic unit operations will be selected according to the nature of the target biomolecule.

Viral inactivation unit operations that can be carried out using the apparatus of the present invention commonly comprise storage vessel in which the liquid comprising the target biomolecule can be stored under conditions for sufficient residence time to inactivate viruses. In certain embodiments the outlet and the inlet of the device can be fluidly connected to generate a re-circulation loop. In one such embodiment the apparatus is set up with a vessel or bag fluidly connected between the “device” inlet and “device” outlet and one of the apparatus outlets is fluidly connected to one of the multiple inlet flow-controller inlets. The vessel or bag between the device “inlet” and “outlet” being fluidly connected to the liquid feedstock inlet is filled by a means to impart flow, typically a pump, or conditioned with at least one other liquid through at least one of the other multiple inlet flow-controller inlets. In certain embodiments the vessel or bag is a mixing vessel or bag. The process liquid is re-circulated through the inlet of the multiple inlet flow-controller to the vessel or bag and back to the inlet of the multiple inlet flow-controller as the solution comprising a target substance is conditioned by at least one additional liquid fluidly connected to at least one other inlet on the multiple inlet flow-controller.

Filtration unit operations that can be carried out include viral, depth and absolute filtration, ultrafiltration, diafiltration and microfiltration. In many embodiments, the filtration unit operation comprises a filter module between the device inlet and device outlet. The filter module is flushed and chased using at least two liquid feeds attached to the multiple inlet flow-controller inlets and the solution comprising a target molecule is fluidly connected to the feedstock inlet. Processing of liquid through the filter is achieved through a means of imparting flow fluidly connected to and positioned downstream of the multiple inlet flow-controller outlet and feedstock inlet, and upstream of the filter module. The filter modules commonly employ configurations which are well known in the bioprocessing art.

Viral filtration, depth filtration and absolute filtration are unit operations that are well known in the art and can be carried out using the apparatus of the present invention commonly employing filter devices, which are well known in the bioprocessing art. In many embodiments the filter device or devices are placed between the device inlet and outlet, in order to execute a specific unit operation. In other embodiments the filter device is positioned downstream of the apparatus outlet, which in certain embodiments allows the apparatus to perform a main unit operation, such as chromatography, viral inactivation, TFF, viral filtration or depth filtration, followed by a secondary filtration operation.

Tangential flow filtration (“TFF”) unit operations that can be carried out using the apparatus of the present invention include conventional recirculating TFF and single pass TFF. In certain embodiments the outlet and the inlet of the apparatus can be fluidly connected to generate a re-circulation loop, an example being re-circulating tangential flow filtration. In one embodiment, as known in the art, the apparatus is set up with a TFF module comprising either flat sheet, hollow fibre or spiral wound membranes between the device inlet and device outlet and the retentate from the TFF module is directed from one of the apparatus outlets to a fluidly connected inlet on a vessel or bag, containing at least one inlet and one outlet. The outlet of the vessel or bag is fluidly connected to the liquid feedstock inlet. The vessel or bag is maintained at a constant level using an auxiliary means to supply the feedstock or liquid into the vessel or bag by being fluidly connected to a second inlet on the vessel or bag. In another embodiment, the apparatus is set up with a TFF module comprising either flat sheet, hollow fibre or spiral wound membranes between the device inlet and device outlet and the retentate from the TFF module is fluidly connected from one of the apparatus outlets back to one of the inlets of the multiple inlet flow-controller valve. In certain embodiments the re-circulation loop from the apparatus outlet to its inlet contains a break vessel or bag. A solution comprising a target substance or a liquid is drawn into the re-circulation loop through the liquid feedstock inlet by a means for imparting flow, typically a pump. The retentate is re-circulated through the TFF module, preferably through one of the multiple inlet flow-controller inlets. The multiple inlet flow-controller may be employed to mix the retentate with at least one other liquid. Operation of recirculating TFF is well known in the art and is controlled through setting a cross-flow rate and transmembrane pressure.

In certain embodiments single pass TFF can be configured with a TFF module comprising either flat sheet, hollow fibre or spiral wound membranes between the “device” inlet and “device” outlet for example, as in the case of single pass TFF as described in WO2017/118835.

In some embodiments a hybrid of single pass and re-circulating TFF can be employed, where the retentate generated using a variable flow valve downstream of the TFF module is returned to the feed vessel.

The mixer according to the present invention may also be employed in apparatus for preparing buffer solutions, especially for use in bioprocessing operations. Methods for producing a biomolecule, especially methods for reducing the proportion of one or more impurities in a biomolecule form an aspect of the present invention.

When the mixer of the present invention is employed in bioprocessing operations, biomolecules which can be processed include, for example pDNA; cellular therapies, vaccines, such as viral vaccines, gene therapy products, sugars, inclusion bodies, particularly inclusion bodies comprising polypeptides; and especially recombinant polypeptides.

pDNA may be in one or more of multiple forms, such as supercoiled, linear and open-circular (i.e. nicked or relaxed) isoforms. Supercoiled pDNA isoform has a covalently closed circular form and the pDNA is negatively supercoiled in the host cell by the action of host enzyme systems. In the open-circular isoform, one strand of the pDNA duplex is broken at one or more places.

Methods for the production of pDNA are well known in the art. pDNA may be natural or artificial, for example, cloning vectors carrying foreign DNA inserts. In many embodiments, the pDNA is in the size range of 1 kilobase to 50 kilobases. For example pDNA encoding expressed interfering RNA is typically in the size range of 3 kilobases to 4 kilobases.

Polypeptides, especially recombinant polypeptides, include therapeutic proteins and peptides, including cytokines, growth factors, antibodies, antibody fragments, immunoglobulin like polypeptides, enzyme, vaccines, peptide hormones, chemokines, receptors, receptor fragments, kinases, phosphatases, isomerases, hydrolyases, transcription factors and fusion polypeptides.

Antibodies include monoclonal antibodies, polyclonal antibodies and antibody fragments having biological activity, including multivalent and/or multi-specific forms of any of the foregoing.

Naturally occurring antibodies typically comprise four polypeptide chains, two identical heavy (H) chains and two identical light (L) chains inter-connected by disulfide bonds. Each heavy chain comprises a variable region ($V_H$) and a constant region ($C_H$), the $C_H$ region comprising in its native form three domains, $C_H1$, $C_H2$ and $C_H3$. Each light chain comprises a variable region ($V_L$) and a constant region comprising one domain, $C_L$.

The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4.

Antibody fragments which can be expressed comprise a portion of an intact antibody, said portion having a desired biological activity. Antibody fragments generally include at least one antigen binding site. Examples of antibody fragments include: (i) Fab fragments having $V_L$, $C_L$, $V_H$ and $C_H1$ domains; (ii) Fab derivatives, such as a Fab' fragment having one or more cysteine residues at the C-terminus of the $C_H1$ domain, that can form bivalent fragments by disulfide bridging between two Fab derivatives; (iii) Fd fragment having $V_H$ and $C_H1$ domains; (iv) Fd derivatives, such as Fd derivatives having one or more cysteine residues at the C-terminus of the $C_H1$ domain; (v) Fv fragments having the $V_L$ and $V_H$ domains of a single arm of an antibody; (vi) single chain antibody molecules such as single chain Fv (scFv) antibodies in which the $V_L$ and $V_H$ domains are covalently linked; (vii) $V_H$ or $V_L$ domain polypeptide without constant region domains linked to another variable domain (a $V_H$ or $V_L$ domain polypeptide) that is with or without constant region domains, (e.g., $V_H$-$V_H$, $V_H$-$V_L$, or $V_L$-$V_L$) (viii) domain antibody fragments, such as fragments consisting of a $V_H$ domain, or a $V_L$ domain, and antigen-binding fragments of either $V_H$ or $V_L$ domains, such as isolated CDR regions; (ix) so-called "diabodies" comprising two antigen binding sites, for example a heavy chain variable domain ($V_H$) connected to a light chain variable domain ($V_L$), in the same polypeptide chain; and (x) so-called linear antibodies comprising a pair of tandem Fd segments which, together with complementary light chain polypeptides, form a pair of antigen binding regions.

Inclusion bodies include insoluble aggregates formed in the cytoplasm of bacterial cells such as *E. coli*, most commonly comprising polypeptide and especially recombinant polypeptide.

BRIEF DESCRIPTION OF THE DRAWINGS

The present invention is illustrated by reference to FIGS. 1 to 6.

The mixer comprises a housing formed from end plates, 1 and 2, which are preferably circular, and a sidewall, 3, which is preferably cylindrical. Fluid inlet, 4, allows fluid to flow under pressure, into a first chamber, 5, preferably located centrally on end plates 1 and 2. The walls, 6, of the first chamber, 5, are preferably cylindrical and concentric with the sidewall, 3. The walls comprise a series of orifices, 7, dispersed along a direction of flow, the nearest point to the fluid inlet of each subsequent orifice overlapping with at least the furthest point from the fluid inlet of the previous orifice, and being off-set along the direction of flow from the previous orifice. The orifices, 7, allow a portion of the flow path to flow into a second chamber, 8, which is preferably cylindrical, and concentric with the sidewall, 3. The second chamber comprises an inner wall formed by the wall of the first chamber, 6, and an outer wall, 9. The outer wall of the second chamber, 9, comprises a series of orifices, 10, dispersed along a direction of flow, the nearest point to the base plate, 1, of each subsequent orifice overlapping with at least the furthest point from the base plate, 1, of the previous orifice, and includes a plurality of additional chamber exits, 11, ending at the end plate, 1. The orifices, 10 and 11, allow a portion of the flow path to flow into a third chamber, 12, which is preferably cylindrical, and concentric with the sidewall, 3. The third chamber comprises an inner wall formed by the outer wall of the second chamber, 9, and an outer wall, 13. The outer wall of the third chamber, 12, comprises a series of orifices, 14, dispersed along a direction of flow, the "start" of each subsequent orifice overlapping with at least the "end" of the previous orifice, and being off-set along the direction of flow from the previous orifice. The orifices, 14, allow a portion of the flow path to flow into a fourth chamber, 15, which comprises an inner wall formed by the outer wall of the third chamber, 13, and the sidewall, 3. The fourth chamber also comprises an outlet, 16, located at the end plate, 1, and a gas release valve, 17, located at the opposite end to the outlet, 16. In use, the mixer is preferable oriented vertically along the axis of chambers 5, 8, 12 and 15, with end plate 1 at the base, and end plate 2 at the top. In use, the principle flow of fluid is away from the end plate, 1, in the first and third chambers, 5 and 12, respectively, and towards the end plate, 1, in the second and fourth chambers, 8 and 15, respectively.

Figure 1:
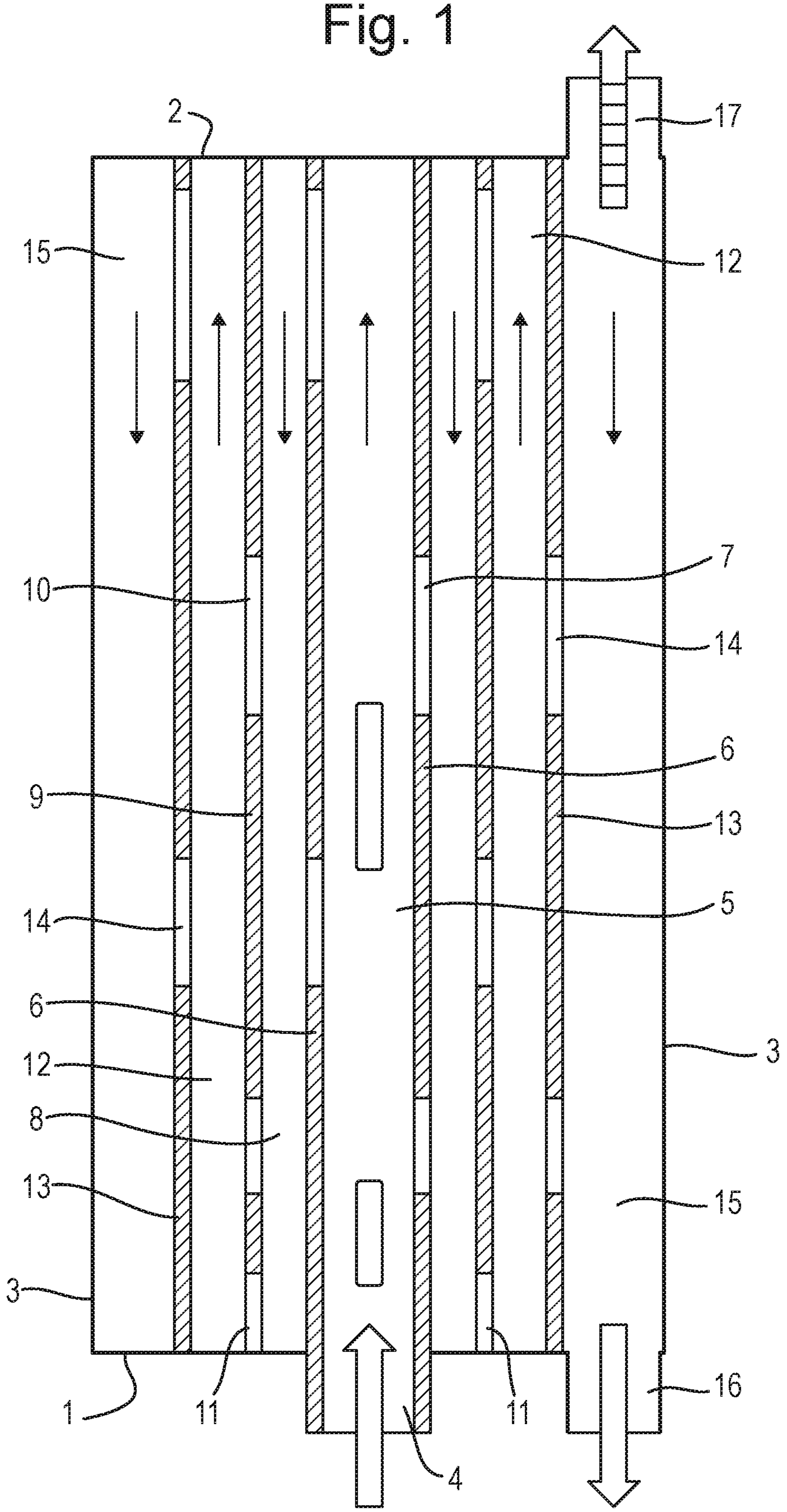
FIG. 1 shows a cross section through a mixer according to the present invention.
Figure 2:
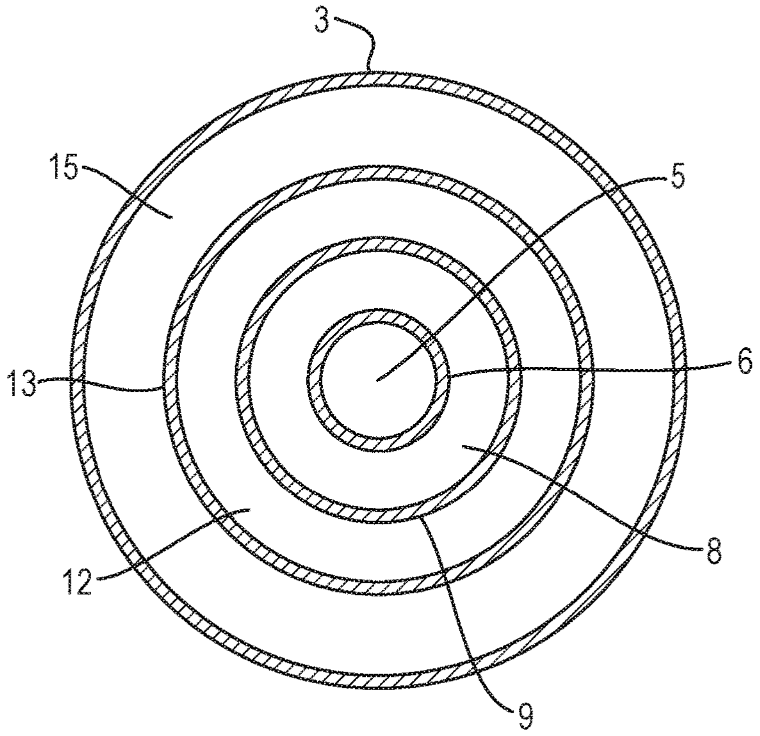
FIG. 2 shows a cross section through a mixer according to the present invention.

FIG. 2 shows a cross-section perpendicular to the axis of chambers 5, 8, 12 and 15 of a mixer of illustrated in FIG. 1, showing the concentric arrangement of the chambers 5 8, 12 and 15, and the walls of said chambers, 6, 9, 13 and 3. For clarity, the cross-section is shown as a section where no orifices are present in any of the walls of the chambers.

The present invention is illustrated without limitation by the following Examples.

EXAMPLE 1

Abbreviations:

L litre
L/h litres per hour
min minute
mm millimetre
s second
TC Tri-clover clamp A solution of 1 M sodium chloride and water for dilution was used in the experimental studies. The mixing chamber was tested on a bioprocessing system as described in application WO2019/158906. The sodium chloride solution was connected to the first inlet and the water was connected to the final inlet, allowing the system to alternately select either inlet. The inlets were connected to a pump through a quaternary valve that was controlled to select either water or a sodium chloride/water mix through repeatedly dosing aliquots of sodium chloride for 1 s and water for 3 s for the duration of the experiment. Downstream of the pump a conductivity sensor monitored the conductivity of the liquid prior to it entering the mixing chamber. A second conductivity sensor downstream of the mixing chamber monitored the final conductivity of the liquid.

The mixing apparatus employed in this experiment used a SpectrumLabs (now Repligen, USA) K06 hollow fibre housing (inner diameter 63 mm, 3 inch TC end, 460 mm long with two 35 mm diameter ports 22.5 mm from each end) with a 3 inch TC blanking plate capping the top and a 3 inch TC base plate with a 15 mm diameter inlet in the centre. The inside of the mixing apparatus was divided into four sections by three circular tubes with a length of 460 mm and increasing diameters. The inner tube, being connected through the base to the inlet of the mixing apparatus, had an internal diameter of 15 mm and a wall thickness of 2.5 mm. The middle tube had an internal diameter of 32 mm and a wall thickness of 2.5 mm. The final, outer, tube had an internal diameter of 50 mm and a wall thickness of 2.5 mm. This resulted in a total internal volume of 1.06 L for the mixing chamber. Each tube contained a spiral of stadium shaped orifices starting at 10 mm above the base, progressing in a clockwise direction, the start of the next orifice was in-line with and therefore slightly overlapping with the previous orifice, but off-set by 90 degrees when viewed along the tube. The length of each orifice increased by 2 mm such that the final orifice was 42 mm long. The orifices on the inner and outer were 4 mm in width and aligned so the shorter, bottom orifice of each tube was facing 180 degrees away from the bottom 35 mm diameter port. The orifices making the spiral on the middle tube had a width of 3 mm and an additional 2 openings were cut into the bottom of the tube. The mid-point of these two openings were at 90 degrees to the shortest, bottom 3 mm wide orifice and each were 10 mm high and 25 mm wide. The middle tube was aligned so that the shortest, bottom orifice faced towards the bottom 35 mm diameter port.

Figure 3:
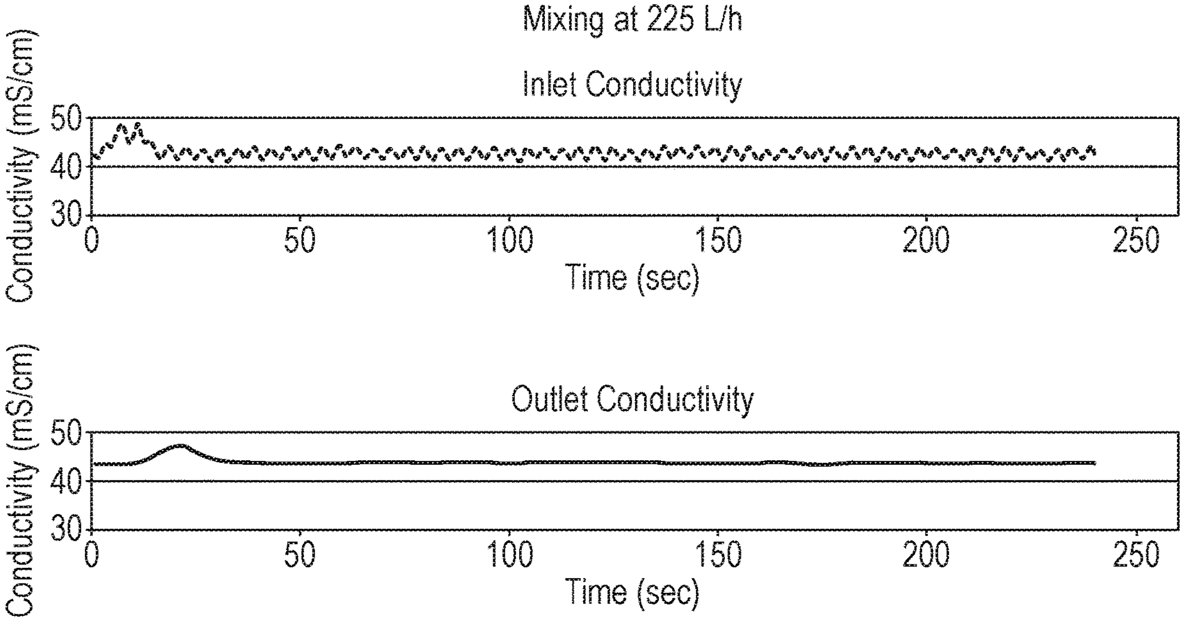
FIG. 3 provides a graphical representation of the conductivity data obtained in Example 1.

The experiment was initiated with the chamber pre-filled to 150 mm from the bottom with liquid. The pump speed was set to 20% of its maximum output, resulting in an average flow of 225 L/h, and the chamber was flushed with water for 2 min before the sodium chloride was dosed into the water at the 1:4 ratio described for 5 min. The conductivity data was recorded from 3 min into the experiment to allow the chamber to exchange into the sodium chloride mix and then equilibrate. The results of Example 1 are given in FIG. 3 and Table 1.

EXAMPLE 2

Figure 4:
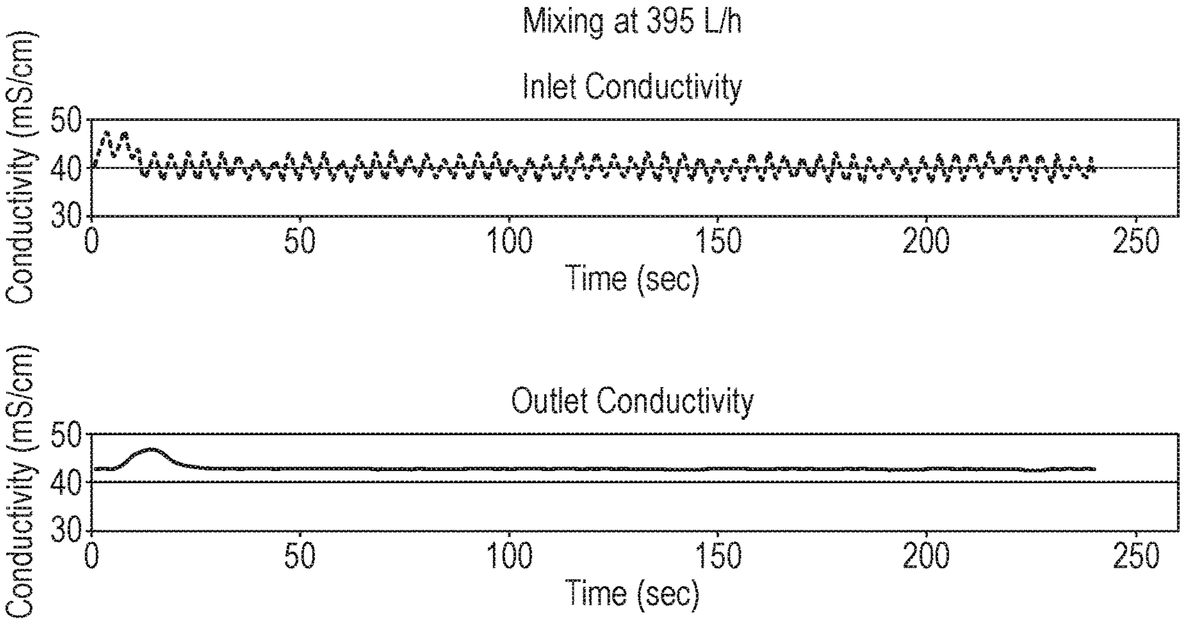
FIG. 4 provides a graphical representation of the conductivity data obtained in Example 2.

The method of Example 1 was repeated, but with the pump speed set to 35% of its maximum output resulting in an average flow of 395 L/h. The results of Example 2 are given in FIG. 4 and Table 1.

EXAMPLE 3

The method of Example 1 was repeated, but with the pump speed set to 50% of its maximum output resulting in an average flow of 560 L/h.

Figure 5:
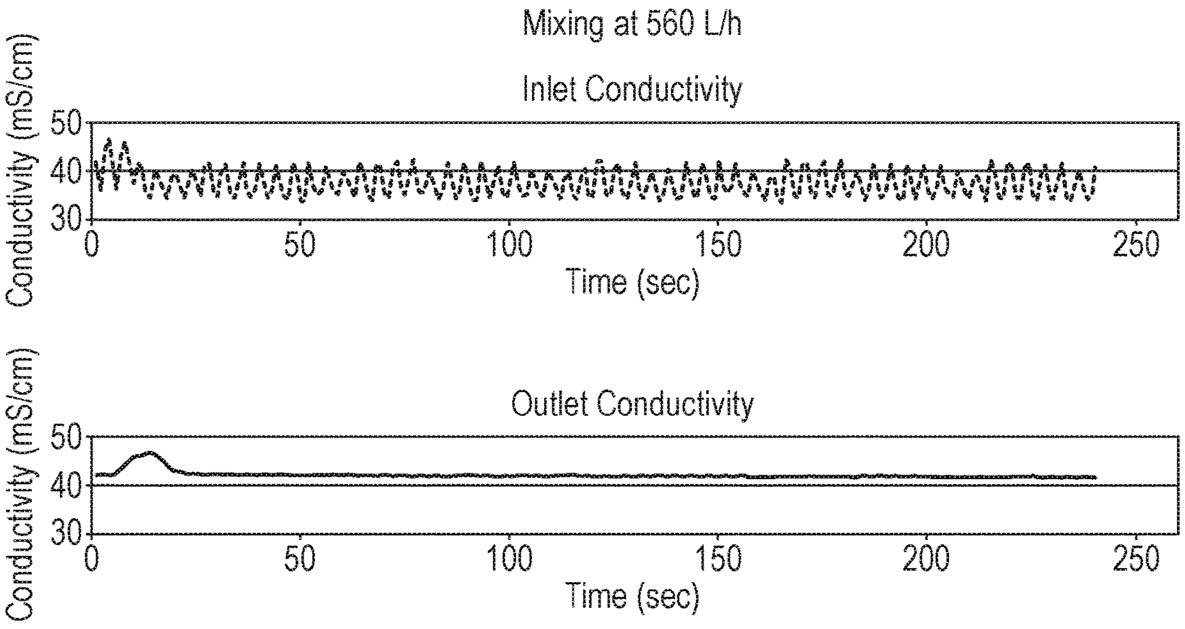
FIG. 5 provides a graphical representation of the conductivity data obtained in Example 3.

The results of Example 3 are given in FIG. 5 and Table 1.

TABLE 1

| | 20% pump speed (225 L/h) | | 35% pump speed (395 L/h) | | 50% pump speed (560 L/h) | |
|---|---|---|---|---|---|---|
| | Inlet | Outlet | Inlet | Outlet | Inlet | Outlet |
| Delta of Conductivity minimum and maximum (mS/cm) | 3.41 | 0.37 | 6.82 | 0.45 | 8.90 | 0.71 |
| Standard Deviation (mS/cm) | 1.00 | 0.18 | 2.13 | 0.10 | 2.81 | 0.16 |
| Average percent deviation of minimum and maximum from mean (%) | 4.0 | 0.3 | 8.6 | 0.5 | 12.0 | 0.9 |
| Mixing Chamber volume utilisation (%) | ~45 | | ~55 | | ~70 | |
| Residence time (s) | 8 | | 6 | | 5 | |

EXAMPLE 4

Figure 6:
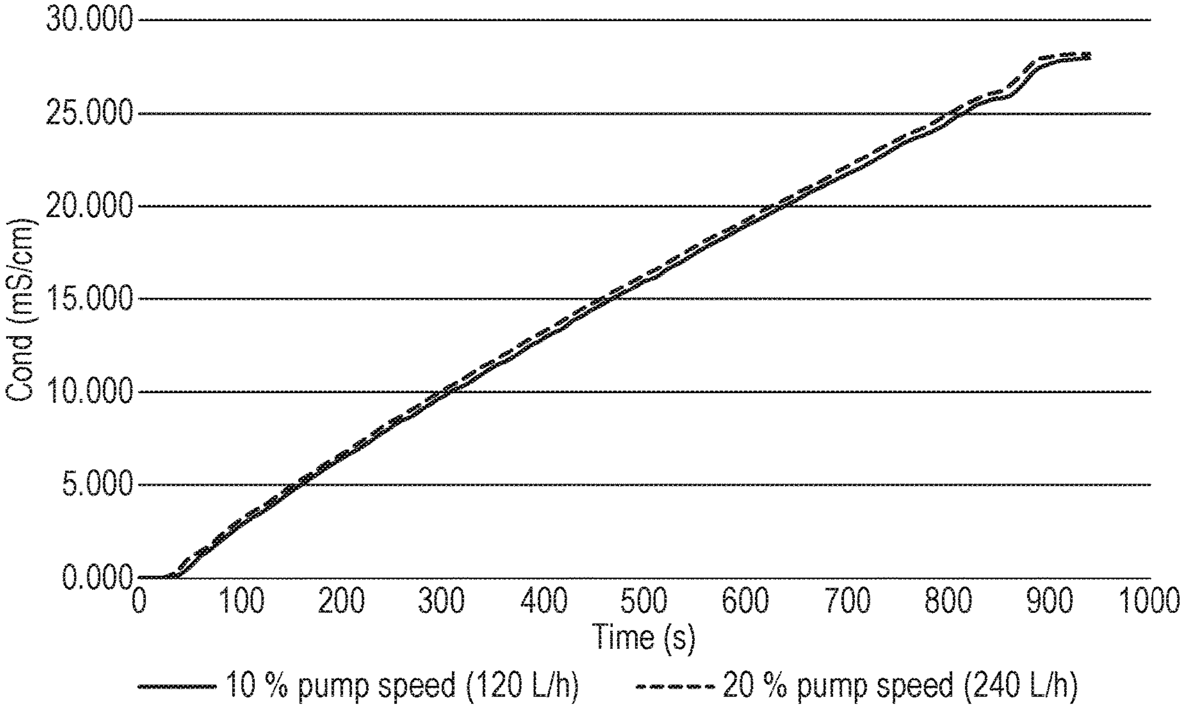
FIG. 6 provides a graphical representation of the conductivity data obtained in Example 4.

Using the mixing chamber and flow path described in Example 1, a conductivity gradient was generated with a 0.23 M sodium chloride solution and water. Using a 4 s duty cycle and the pump speed set to 10% or 20% of maximum output two gradients were run. Each gradient was generated by running from 0 to 100% sodium chloride over 15 min. In practice this required calculating the valve open time ratios between the water and sodium chloride inlets every 4 s. For example, initially the water valve was open for the full 4 s, at 1 min the sodium chloride valve was open for 0.27 s and the water valve was open for 3.73 s, and by 10 min the sodium chloride valve was open for 2.67 s and the water valve was open for 1.33 s. At the end of the gradient the sodium chloride valve was open for the full 4 s. The conductivity of both gradient runs were measured post mixing chamber and are plotted in FIG. 6.

The Examples demonstrate that the mixer of the present invention allows mixing of liquids that are delivered chronologically into the flow path within a specific time period. In most cases, ratios of the liquids are added within a total liquid volume that is less than or equal to the liquid volume within the mixing chamber. For continuous operation, a duty cycle is used to allow repeated, chronological delivery of two or more liquids into the mixer.

In the mixers of the present invention, a surprisingly small hold up volume in the mixer for the range of flow rates employed. Further, the volume of mixer is surprisingly very small compared with the volumes of liquid mixed.

The mixers of the present invention can act both as an apparatus to induce mixing of two or more liquids, and simultaneously as an apparatus for trapping and retaining gas bubbles from the liquid stream.

The invention claimed is:

1. A static mixing apparatus for mixing a fluid, comprising a housing having end plates and a sidewall, a plurality of chambers in series within the housing, wherein the plurality of chambers comprises an innermost chamber of the series comprising a chamber wall and a fluid inlet, a second chamber formed from the chamber wall of the innermost chamber and an outer chamber wall, an optional subsequent chamber formed from the outer chamber wall of a prior chamber and an outer chamber wall, and an outermost chamber of the series formed from an outer chamber wall of a prior chamber in series and the sidewall of the housing and comprising a fluid outlet, each chamber wall except the outermost chamber including orifices defining a flow path from the fluid inlet and into each chamber in series and to the fluid outlet, wherein the outermost chamber further comprises a gas outlet located at the opposite end of the static mixing apparatus to the fluid inlet and fluid outlet.

2. The mixing apparatus according to claim 1, wherein each chamber of the plurality of chambers in series is concentric and of circular cross section.

3. The mixing apparatus according to claim 1, which comprises an even number of chambers.

4. The mixing apparatus according to claim 1, wherein the combined area of all orifices and any additional chamber exits within the chamber wall separating any two of the plurality of chambers is greater than the area of the fluid inlet.

5. The mixing apparatus according to claim 4, wherein the inlet and outlet are located at a base of the mixing apparatus.

6. The mixing apparatus according to claim 1, wherein the fluid inlet is located at a base of the mixing apparatus, and wherein the area of each orifice in the chamber wall increases along the direction of the chamber wall away from the fluid inlet of the mixing apparatus.

7. The mixing apparatus according to claim 1, comprising an even number of chambers and wherein the direction of flow within each chamber beginning with the fluid inlet alternates with each subsequent chamber.

8. The mixing apparatus according to claim 7, wherein the orifices between adjacent chambers are offset.

9. The mixing apparatus according to claim 1, wherein the fluid inlet and fluid outlet are located at the base of the mixing apparatus, the chamber wall of the second chamber has two initial orifices at a base of the chamber wall of the second chamber.

10. A method for mixing two or more fluids, which comprises passing the fluids through a mixing apparatus according to claim 1.

11. The method according to claim 10, wherein the fluids are aqueous solutions, and the method comprises a step in a bioprocessing operation.

12. The method according to claim 11, wherein the method is comprised in a method for producing a biomolecule.

13. An apparatus for carrying out a bioprocessing operation, the apparatus comprising mixing apparatus according to claim 1.

14. A method for producing a biomolecule which comprises processing the biomolecule in a bioprocessing operation employing apparatus according to claim 13.

15. The mixing apparatus according to claim 1, wherein each chamber is concentric and of circular cross section and wherein the mixing apparatus comprises an even number of chambers.

* * * * *